United States Patent
Lore et al.

(10) Patent No.: US 10,088,695 B2
(45) Date of Patent: Oct. 2, 2018

(54) EYEGLASSES FRAME COMPRISING EMBEDDED ELECTRONICS

(71) Applicant: Essilor International, Charenton-le-Pont (FR)

(72) Inventors: Marie Lore, Charenton-le-Pont (FR); Guillaume Broutin, Charenton-le-Pont (FR); Jean Sahler, Charenton-le-Pont (FR); Paul Gil, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/383,546

(22) Filed: Dec. 19, 2016

(65) Prior Publication Data

US 2017/0176776 A1  Jun. 22, 2017

(30) Foreign Application Priority Data

Dec. 21, 2015  (EP) .................................... 15307074

(51) Int. Cl.
| | |
|---|---|
| G02C 1/00 | (2006.01) |
| G02C 11/00 | (2006.01) |
| G02C 5/00 | (2006.01) |
| B29D 12/02 | (2006.01) |

(52) U.S. Cl.
CPC .............. *G02C 11/10* (2013.01); *B29D 12/02* (2013.01); *G02C 5/008* (2013.01); *G02C 2200/14* (2013.01)

(58) Field of Classification Search
CPC .... G02C 11/10; G02C 5/008; G02C 2200/14; B29D 12/02

USPC .................................................... 351/41, 158
See application file for complete search history.

(56) References Cited

U.S. PATENT DOCUMENTS

| | | | |
|---|---|---|---|
| 4,443,074 A | 4/1984 | Giacomelli | |
| 2007/0254140 A1 | 11/2007 | Zou | |
| 2012/0169990 A1 | 7/2012 | Burnstein | |
| 2014/0259271 A1 | 9/2014 | Cox et al. | |

FOREIGN PATENT DOCUMENTS

| | | |
|---|---|---|
| CN | 201936078 U | 8/2011 |
| JP | 2003021813 A | 1/2003 |

OTHER PUBLICATIONS

Extended European Search Report for EP15307074.3 dated Jun. 8, 2016.

*Primary Examiner* — Tuyen Tra
(74) *Attorney, Agent, or Firm* — Oblon, McClelland, Maier & Neustadt, L.L.P.

(57) ABSTRACT

The invention is related to a method of manufacturing of a composite substrate comprising an embedded electronic device by forming in a first substrate a cavity for receiving the electronic device; disposing the electronic device between the first substrate and a second substrate in said cavity; providing a solvent of cellulose acetate in-between the first substrate and the second substrate, maintaining the first substrate and the second substrate in contact together, wherein the electronic device is maintained between the first substrate and the second substrate, forming the composite substrate.

16 Claims, 7 Drawing Sheets

EYEGLASSES FRAME COMPRISING EMBEDDED ELECTRONICS

FIELD OF THE INVENTION

The present invention relates to the field of embedded electronics and in particular embedded electronics adapted for making accessories. One particular aspect of the invention is the use of embedded electronics in order to manufacture active eyeglasses, i.e. Eyeglasses comprising an electronic device and able to have an active function controlled by the electronic device.

BACKGROUND OF THE INVENTION

In general, when electronic devices are introduced into accessories, and in particular active into eyeglasses, an opened cavity is needed. Afterwards, the cavity is filled or a hood is provided to enclose the electronic device into the accessory.

However, such solutions have the double drawback of often leaving a visible trace on the frame and of having a fixed shape.

In particular those solutions consist in preparing a frame-part comprising a premade-shell. In particular, for the frame-parts destined to comprise electronic devices, the shape is designed ab-initio by the electronic glasses manufacturer and there are no possibilities for designers specialized in frame design to intervene and propose new shapes, unless mandated by said manufacturer.

Accordingly, those shells come in a limited number of variations, often linked to the manufacturer and one has to choose in a limited amount of choice.

There is thus the need to provide elements allowing more flexibility in frame design for electronic glasses.

SUMMARY OF THE INVENTION

The invention thus pertains to a method of manufacturing of a composite substrate comprising an embedded electronic device, comprising the following steps:
providing a first substrate of cellulose acetate and a second substrate of cellulose acetate;
shaping at least one of the first substrate or the second substrate according to a first predetermined pattern so as to form a cavity for receiving the electronic device;
disposing the electronic device between the first substrate and the second substrate in said cavity;
providing a solvent of cellulose acetate in-between the first substrate and the second substrate,
and
maintaining the first substrate and the second substrate in contact together, wherein the electronic device is maintained between the first substrate and the second substrate, forming the composite substrate.

The solvent of cellulose acetate enables to solvate partially the material, enabling a surface portion of the first substrate and of the second substrate to mix together in a semi-liquid phase. By maintaining the substrates together, the solvent is allowed to evaporate, allowing the mixed material of the first substrate and second substrate to become once again fully solid, fixing the two surfaces together.

In other words, the step of maintaining the first substrate and second substrate in contact together is preferably done for a determined duration, for example until enough of the solvent has evaporated, so that the first substrate and second substrate are attached together strongly enough to be manipulated together. For example the step of maintaining the first substrate and second substrate in contact together can be done by pressing the second substrate onto the first substrate or vice-versa.

In a particular case the first substrate and/or the second substrate is a cellulose acetate slab or sheet. Such cellulose acetate slab or sheet may then be used for multiple purposes, after having had the electronic device embedded. Such purposes may be for example to be machined into a part of a frame for spectacle glasses, or machined into a decorative plate, or utility or decorative element or even cellulose acetate jewellery.

Alternatively the first substrate is a part of a frame of an apparatus wearable by a user. Thus, already prepared spectacle frames or part of such frames may be embedded with an electronic device.

The solvent is advantageously acetone.

In an embodiment, a cavity is formed on both substrates. This enables to spread the cavity formation step and any potential burden on the material into two substrates and enable to embed electronic devices that are thicker than either of the first and second substrate.

In another embodiment, the cavity opens on both ends of the first substrate, one opening being smaller than the other, for example forming as slot adapted to receive part of the electronic device. It allows, for example to fix, for decorative or design purpose another acetate substrate over or in the smaller opening, or allow to have access to the electronic device or part of the electronic device or allow a part of the electronic device to protrude from the final cellulose acetate product.

The invention also pertains to a method for manufacturing spectacles frame comprising the steps of
 a) Providing at least one part of a frame comprising an embedded electronic device, such as obtainable by the method according to the process above, or
 b) Providing a composite substrate obtained according to any process as described above and
  i. designing at least a part of a frame on the composite substrate, the part of a frame having a designed shape that is determined by taking into account the electronic device embedded in the composite substrate, and,
  ii. cutting the composite substrate according to the designed shape, forming a part of a frame comprising an embedded electronic device,
 c) And assembling the part of a frame provided according to point a) or point b) with further parts of a frame so as to manufacture a frame.

For example using the part of the frame being prepared according to point b), the step b). i. may comprise a step of referring to markings present on the substrate that indicate at least a feature of the electronic device before designing the part of the frame on the composite substrate, wherein determining the designed shape of the part of the frame and its position in the composite substrate takes into account to the shape and position of the electronic device in the composite substrate.

The invention also pertains to a composite cellulose acetate bloc, comprising an internal cavity encompassing an electronic device, the cavity being tight-fitted to the electronic device so that the electronic device cannot be removed from the block without a step of cutting open part of the bloc. In an embodiment, the bloc is devoid of traces of melting or gluing and devoid of sealing traces.

For example the cellulose acetate slab or sheet is of the type adapted, in width and length, to be used to manufacture a part of a frame of a wearable apparatus, such as the bridge or one of the arms.

The composite cellulose acetate bloc may comprises markings indicating the position of features of the electronic device, the markings being present in form such as engraving, glued stamps, ink embedded in the cellulose acetate, ink present on the cellulose acetate, specific shapes on the bloc, such as notches or bumps or assimilated.

The features of the electronic device that are indicated may for example be any feature of the list consisting in the orientation, the position, shape or area covered by the electronic device, and/or features related to any specific functional area of the electronic device, its type, position or shape, and/or feature related to connection area or point, a battery point, an entry point, connections paths, position or orientation of one or more sensors.

The invention also pertains to a wearable apparatus, comprising:
 a frame configured to be wearable on a user, wherein at least one element, or part, of said frame is in acetate and comprises an embedded electronic device so that the electronic device cannot be removed from the element without a step of cutting open part of the element.

Further, in one embodiment, at least one of the first arm or the second arm comprises an embedded electronic device inserted by providing a first substrate and a second substrate, shaping at least one of the substrates according to a first predetermined pattern so as to form a cavity for receiving the electronic device, disposing the electronic device between the first substrate and the second substrate in said cavity, depositing a solvent between the first substrate and the second substrate and maintaining the first substrate and the second substrate in contact together so as to form a composite substrate.

DESCRIPTION OF THE FIGURES

FIG. 3A-1 illustrates a top view of part of frames with an electronic device embedded according to the process of the invention.

FIG. 3A-2 illustrates a cut view of part of frames with an electronic device embedded according to the process of the invention.

FIG. 3B-1 illustrates a top view of part of frames with an electronic device embedded according to the process of the invention.

FIG. 3B-2 illustrates a cut view of part of frames with an electronic device embedded according to the process of the invention.

DESCRIPTION OF EMBODIMENTS

Figure 1A:
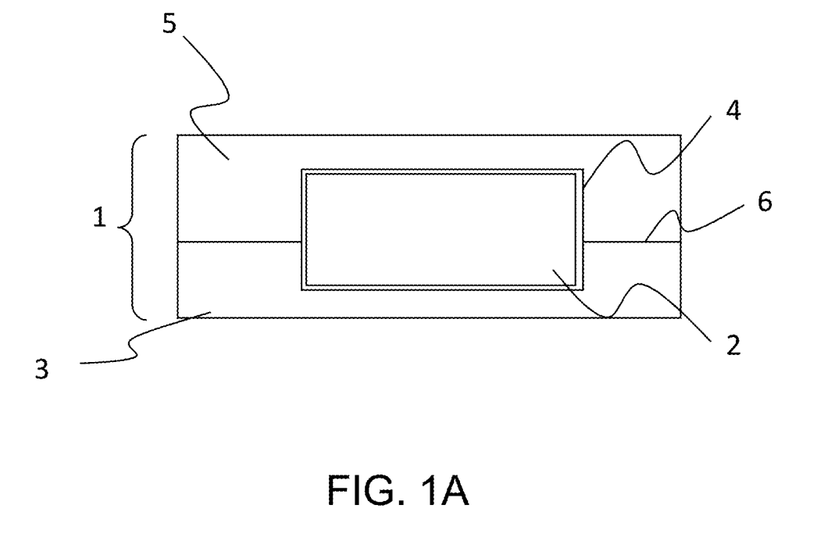
FIG. 1A illustrates a cut view of acetate slabs according to the invention.

A first embodiment of the invention is shown, in a cut view, in FIG. 1A that represents an acetate slab or acetate sheet 1 according to the invention, comprising an inserted electronic device 2. The acetate sheet 1 is composed of two elements affixed together, a first substrate 3 comprising a cavity 4 adapted to receive the electronic device 2, and a second substrate 5 without such cavity. The electronic device 2 is filling part of the cavity 4. In most embodiments the first substrate 3 and the second substrate 5 are immovable with respect to each other, and can be considered fused together.

Figure 1B:
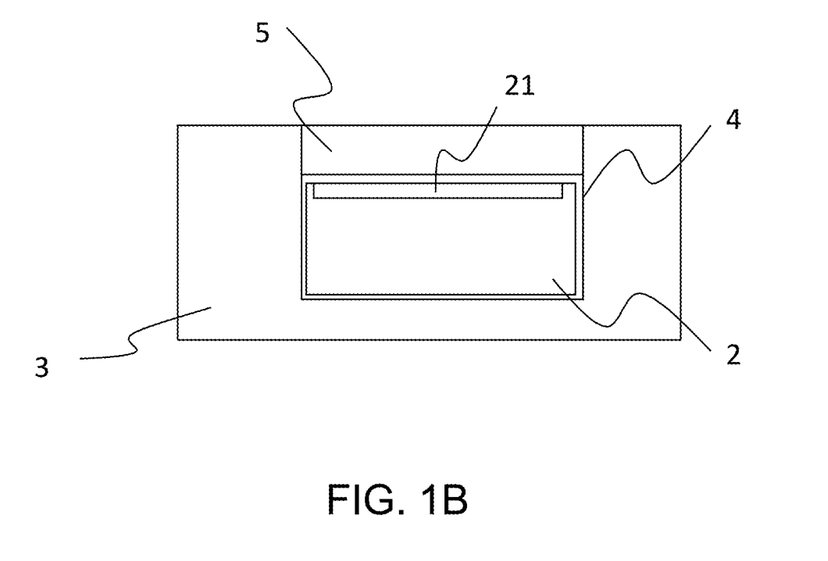
FIG. 1B illustrates a cut view of acetate slabs according to the invention.

The first substrate 3 and the second substrate 5 form together the acetate sheet 1 which is a composite substrate. The interface 6 shown on FIG. 1 between the first substrate 3 and the second substrate 5 is not necessarily perceptible. In some cases, slight interruption of decorative pattern at the surface of the acetate sheet 1 can show the interface 6. However, in some cases, for example when the acetate sheet in completely uniform in colour, it is possible to not be able to see the interface 6 without microscopic examination. In some embodiments, such as the one shown in FIG. 1B, the first substrate and the second substrate have a different coloration and/or a different kind of pattern. For example one of the first and second substrate might be mostly transparent, and/or clear when compared to the other substrate. In that particular embodiment, the second substrate 5 is smaller than the first substrate 3 and is mostly positioned above the cavity 4. In the embodiment described therein, the second substrate 5 seems to be fitted, seamlessly, in a hole 40 in the first substrate 3, such hole 40 comprising the internal cavity 4, the electronic device 2 and a plug 5 consisting of the second substrate 5. In such case, the second substrate 5 is substantially transparent, which allows vision of the electronic device. This can be either an aesthetic decision or a way to control the electronic device, or to have vision of part of the electronic device, such as a screen or display 21.

Figure 2A:
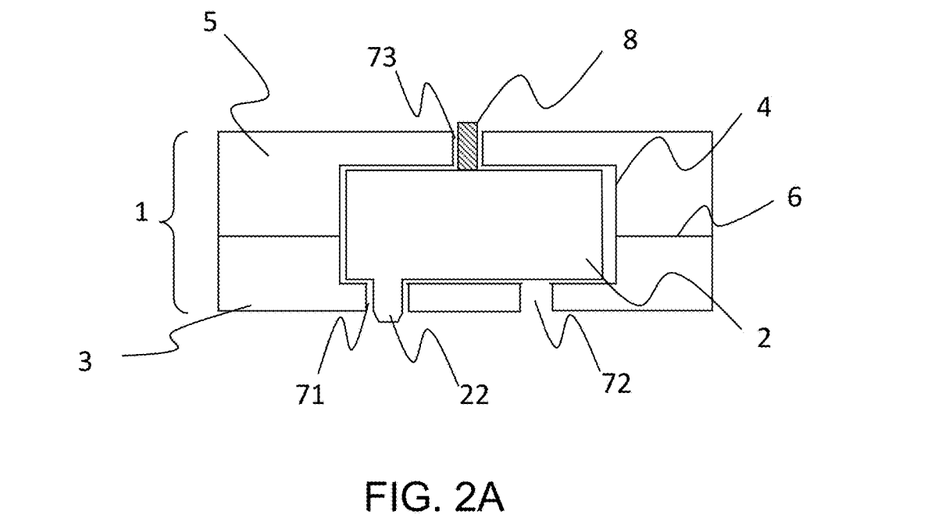
FIG. 2A illustrates a cut view of acetate slabs comprising openings in the acetate slab and/or markings.
Figure 2B:
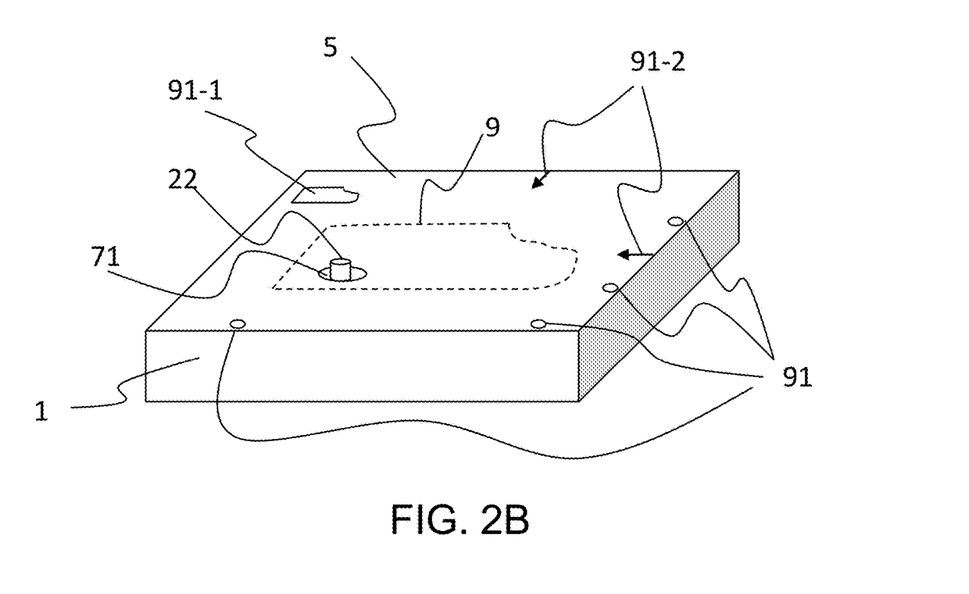
FIG. 2B illustrates an external view of acetate slabs comprising openings in the acetate slab and/or markings.

In a second embodiment, the acetate sheet 1, as shown in cut view in FIG. 2A, and in external view in FIG. 2B, can have an opening 71, 72, 73. For example opening 71 which allow a protrusion 22 of the electronic device to appear through the surface of the acetate sheet, or opening 72 which only gives access to the electronic device 2, or opening 73 which comprises a tertiary element 8 in contact with the internal cavity 4.

As seen in this theoretical embodiment, the openings 71, 72, 73 are too small to allow the whole electronic device to pass through. However they may enable a multitude of functions. In a first embodiment the opening 71 allows a protrusion 21 of the electronic device 2 to protrude from the acetate sheet 1: it can be for example a diode, a radio/RFID/Bluetooth/Wi-Fi antenna, a button to be pushed, scrolled, displaced, a touch-pad or a touch screen, a loudspeaker . . . Etc. In a second embodiment it allows an opening 72 toward the cavity: it can for example be in order to allow air circulation or heat evacuation out of the acetate sheet, or to provide access to a tool or to enable to fix a decoration . . . etc. In the third non-limiting embodiment described above, the opening 73 enables to have a tertiary element 8 to pass through the acetate sheet and access the cavity. In can be a plastic element or a metal element or even of another material. It can be a soft element that allows to activate a part of the electronic device 2. In the case of a metal element, it can be part of a heat sink or a radiator, or part of an antenna that is not initially part of the electronic device 2.

As shown in this figure, the acetate sheet 1 may comprise markings 9, 91 on at least one of its surfaces. The markings 9 enable to identify the position and/or orientation of the electronic device 2 in acetate sheet 1. In one embodiment, the marking 9 shows the outline of the electronic device. In another embodiment, the marking is a series of marks 91, which enable to designate the external dimensions of the electronic device, and for example comprises an indicator 91-1 of an orientation and shape of the electronic device, for example a scaled schematics of the electronic device, and/or for example marks 91-2 enabling to pin-point a specific part of the electronic device, here, a recess in the shape of the electronic device.

The markings 9 may be in any of the adapted form such as an engraving, glued stamps, a thin plastic film affixed to the acetate sheet, ink embedded in the cellulose acetate, ink present on the cellulose acetate, specific shapes on the bloc, such as notches or bumps or assimilated.

The markings 9 may enable to identify any features of the electronic device such as the orientation, the position, shape or area covered by the electronic device, and/or features related to any specific functional area of the electronic device, its type, position or shape, and/or feature related to connection area or point, a battery point, an entry point, connections paths, position or orientation of one or more sensors.

Figures 3A, 3A:
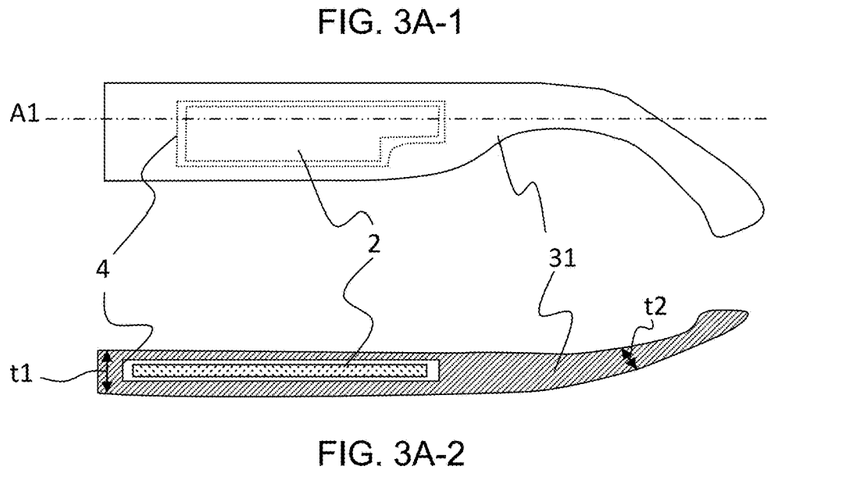

A third embodiment of the invention is shown in FIGS. 3A and 3B, where the composite substrate 31, 32 is a part of a frame of spectacle glasses. In FIGS. 3A-1 and 3A-2, the composite substrate 31 is a part of an arm 31 of a frame of spectacle glasses. The arm 31 comprises a cavity 4 that encompasses an embedded electronic device 2. It is further notable that the arm 31 comprises a part with a thickness t1 adapted to accommodate the cavity 4 and the electronic device 2 and a part with a thickness t2, smaller, which has the usual thickness for known arms of spectacles.

Figure 3B:
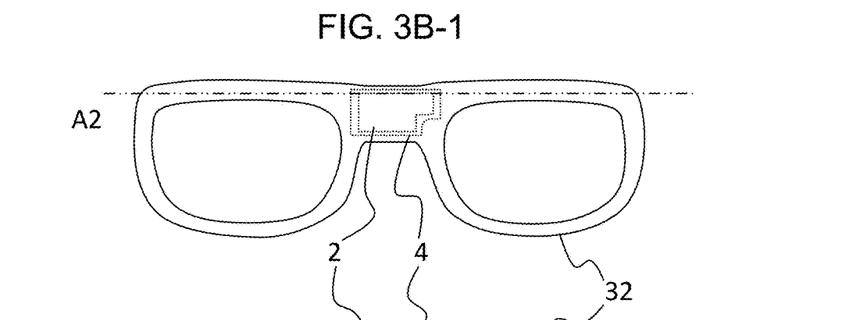
Figure 3B:
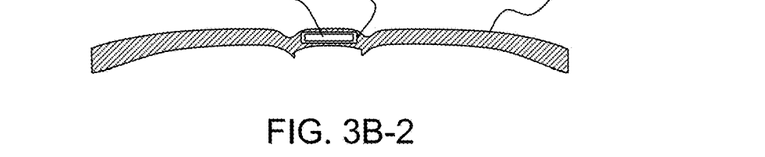

In FIGS. 3B-1 and 3B-2, the composite substrate 32 is a part of the front face 32 of a frame of spectacle glasses. It also comprises a cavity 4 encompassing an embedded electronic device 2.

As can be shown in FIGS. 3A-1 and 3B-1 which are top view of the elements shown, the cavity 4 and the electronic device are illustrated as if seen by transparency, the cavity 4 needs not to be specifically rectangular. It may have any shape suited to encompass the electronic device 2.

As can be shown in FIGS. 3A-2 and 3B-2 which are cut views trough plans A1 and A2 respectively, the cavity 4 is closed enough that it does not allow the removal of the electronic device.

It is understood that the elements described in FIGS. 3A and 3B can present any of the variations described in relation with the previous figures.

In particular, the composite substrate 31, 32, part of a frame, may have been manufactured by any of the methods described here-after. For example, one provided a composite acetate sheet comprising an embedded electronic device and formed a part of a frame with it, by sculpting, cutting, edging, drilling and deforming the material, and other alternative methods. Alternatively, one provided an existing part of a frame made in acetate as a first substrate, and an acetate piece adapted to be fixed to the first substrate, at least one of the acetate piece or the acetate part of a frame having a cavity adapted to receive the electronic device, disposing the electronic device in said cavity, and fixing the acetate piece to the first substrate so as to encapsulate the electronic device, using acetone as a solvent.

Figures 4A, 4B:
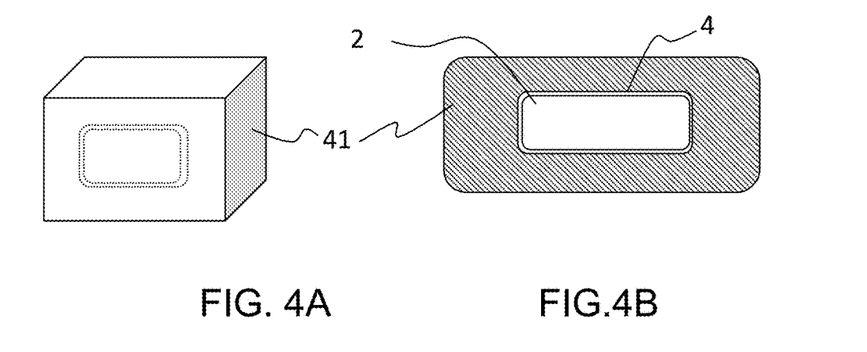
FIG. 4A illustrates a perspective view of an acetate bloc according to the invention.
FIG. 4B illustrates a cut view of an acetate bloc according to the invention.

In a fourth embodiment, illustrated in FIGS. 4A, the first substrate is an acetate bloc 41 comprising an embedded electronic device 42 as show in the cut view FIG. 4B. This acetate bloc 41 may be used in any possible way, such as to enable to create acetate jewellery, or decorative ornament or trinket, or any other device.

Further, the invention pertains to a process for manufacturing a composite substrate comprising an embedded electronic device. In particular it pertains to a process for embedding such electronic device into an acetate device.

Accordingly a general embodiment of a process according to the invention is described in FIGS. 5A to 5E.

Figure 5A:
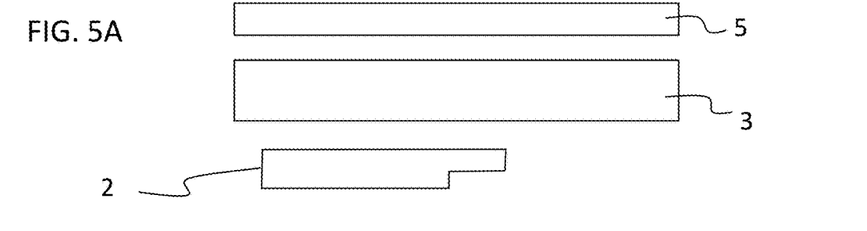
FIGS. 5A to 5E illustrate perspective views of an embodiment of a process according to the invention.

In a first step, illustrated in FIG. 5A, one provides a predetermined electronic device 2, a first substrate 3 and a second substrate 5, both substrates being in acetate.

Figure 5B:
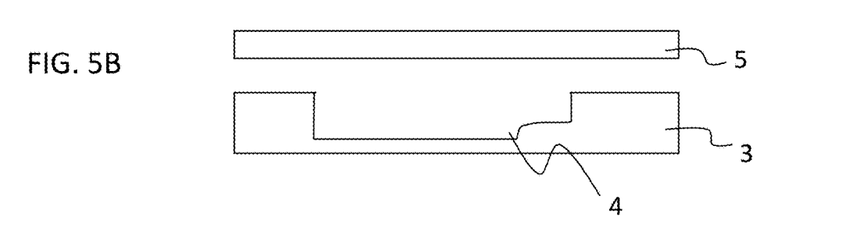

Then, in a second step, illustrated in FIG. 5B, one forms a cavity 4 into at least one of the substrates, here in the first substrate 3. The cavity 4 has a shape adapted to at least receive the electronic device 2 and still allow the first and second substrate to be able to come into contact together despite the presence of the electronic device 2.

The cavity 4 may be formed using any machining process known to the person skilled in the art, and may for example be done using by turning, milling, piercing, cutting . . . etc The surface of the interior of the cavity, bottom and/or walls, may be smooth or rough, for example with traces of the machining process used to form the cavity. Alternatively, the interior of the cavity may be mostly without traces of the machining, but the interior could still not be smooth, for example having bumps which may be adapted to correspond to features of the electronic device. Such bumps could facilitate the positioning of such device into the cavity.

Figure 5C:
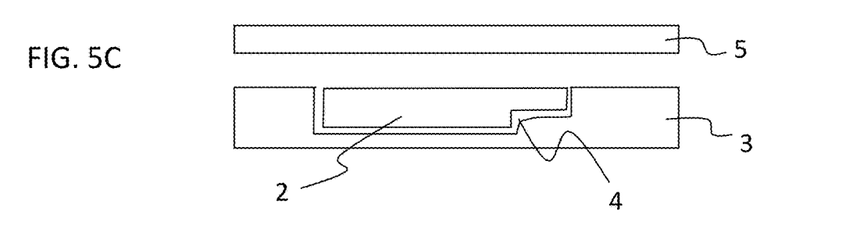

Then, in a third step, illustrated in FIG. 5C, one introduces the electronic device 2 into the cavity 4.

As shown here, the cavity 4 has a depth that varies depending on the position in the cavity 4. This variation of depth is adapted to the shape of the electronic device 2 that is predetermined to be embedded in the cavity. For example the depth is adapted to the shape of the electronic device within less than 1 mm, or even within less than 500 µm, or even less than about 300 µm.

Figure 5D:
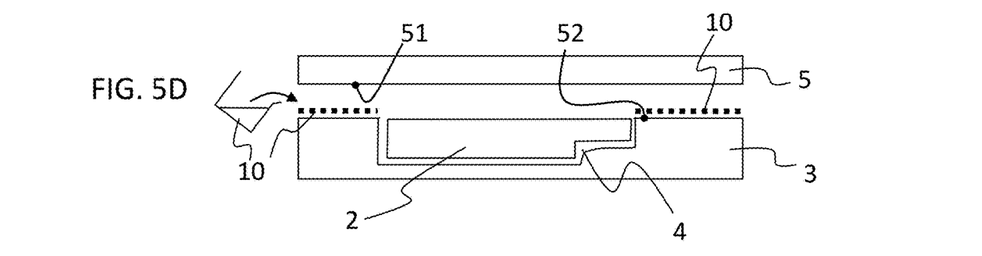

In a fourth step, illustrated in FIG. 5D, a layer of acetone 10 is deposited onto the surface of one or both substrates 3, 5 and the two substrates are brought in contact, enclosing the electronic device 2, present in cavity 4, between the two substrates 3,5.

It is advantageous that the faces of the substrates that are brought together in contact have a surface with a matching shape, not counting the cavity for at least the majority of the surface. In an embodiment, most, for example more than 80%, of the surfaces of the first and second substrate that are brought together have a matching shape (not counting the cavity). For example, both surfaces are flat.

It is to be reminded that in this step, while the electronic device is embedded in the cavity, in-between the two substrates, some part of the electronic device may be present out of the substrates.

The acetone 10, which is a solvent of the acetate material, dissolves partially both the surface of the first substrate and the surface of the second substrate which are brought into contact with it. As the two surfaces both have a partially dissolved layer and are brought into contact with each-other, the partially dissolved acetate material of both surfaces mixes together.

Figure 5E:
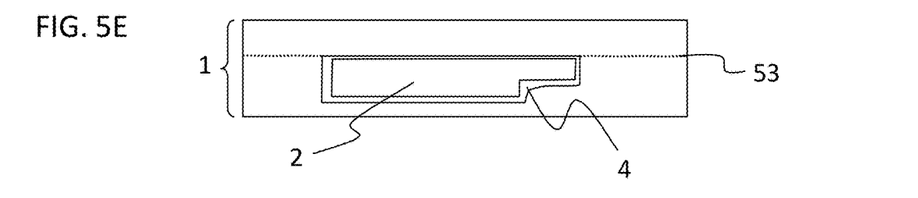

After being allowed to dry while being maintained in contact, the acetone solvent disappear from the interface 53 between the two substrates; the two substrates are joint together, as shown in step 5E and form a single composite substrate 1, comprising the electronic device embedded into acetate material.

The two substrates may be thus maintained for a duration comprised between 10 seconds and 1 h, for example 20 seconds or 1 minute.

After such joining, the interface 53 between the formerly separate two substrates can then be faint and be barely detectable. However, such detection is heavily controlled by the cosmetic aspects of the two substrates. Indeed, if the two substrates were of same uniform color and shade, the interface would be barely noticeable. However, if different colors or shades were used, such detection would be easy. It would also be easy to detect the interface if the acetate material of the substrates have pattern in it and the patterns are not perfectly aligned. However, using the invention, whether the interface is detectable or not, the material at the interface have fused together and the two substrates have become indissociable.

FIGS. 6A to 6D illustrates non-limiting examples of variations of the process above-described.

Figure 6A:
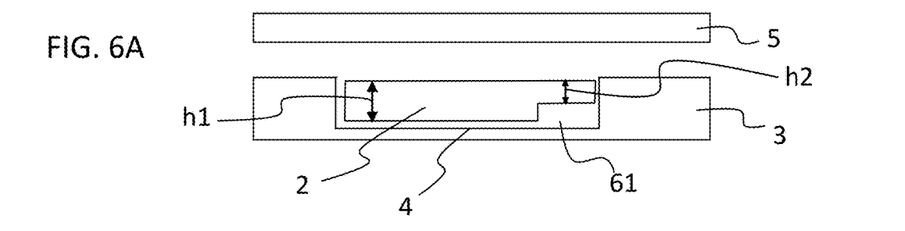
FIGS. 6A to 6D illustrate perspective views of variants of steps of the process illustrated in FIGS. 5A to 5E.

FIG. 6A represents a variant of the process, where the main difference is illustrated by showing the variation during the third step, where the electronic device 2 is inserted into the cavity 4. Here, the example cavity has a shape that is not completely conformal to the shape of the electronic device 2. As seen here, the cavity 4 is strictly a parallelepiped, while the electronic device has at least a variation in thickness. Indeed, part of the electronic device has a thickness h1, while another part has a thickness h2 different from h1. Consequently a gap 61 is present on a part of the cavity.

Figure 6B:
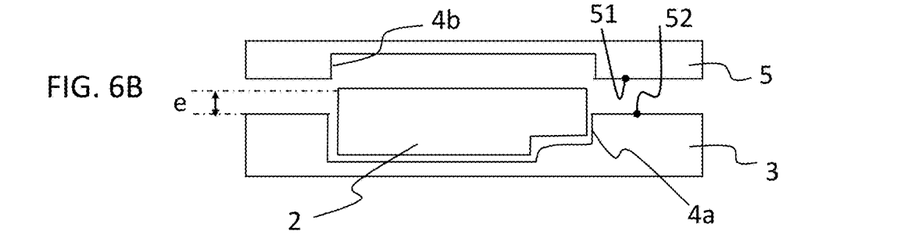

FIG. 6B represents another variant of the process, where the main difference is illustrated by showing the variation during the third step. In this variant, the cavity is formed by cooperation of a first cavity 4a in the first substrate 3 and a second cavity 4b formed in the second substrate 5. Said in another way, the cavity is not formed solely of a cavity in the first or the second substrate. In particular, when the electronic device 2 is inserted in the first cavity 4a of the first substrate 3, it is thicker than the first cavity 4a is deep, and it has, at least one part of the electronic device 2 that protrudes from the first cavity 4a by an excess thickness e. Thus, the second substrate 5 is provided with a second cavity 4b adapted to cooperate with the electronic device 2 and the first cavity 1 so as to allow the main surface 52, 51 of the first substrate 3 and of the second substrate 5 to be brought into contact while the electronic device 2 is present in the cavity 4 formed by the cooperation of the first cavity 4a and the second cavity 4b.

For example the second cavity 4b has a depth that is greater than the excess thickness e at least in the region predetermined to cooperate with the part of the electronic device 2 than protrudes from the first cavity 4a.

Figure 6C:
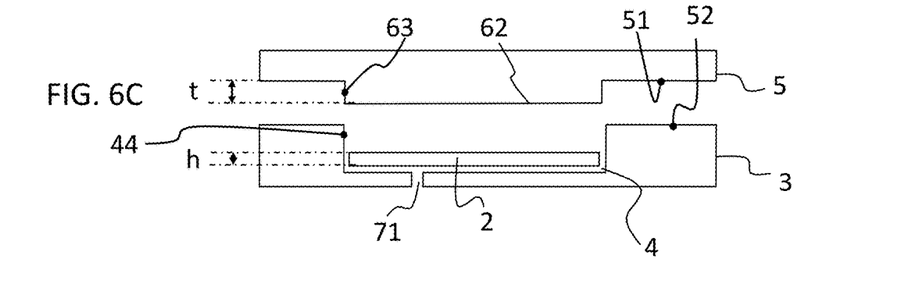

FIG. 6C represents yet another variant of the process, where the main difference is illustrated by showing the variation during the fourth step. In this variant, the electronic device 2, when inserted in the cavity 4 does not reach the opening of the cavity 4 in at least one area. Said in other words, in at least one area of the cavity, the height h of the electronic device 2 is smaller than the depth of the cavity 4. While this preceding feature may exist in other variants of the invention, this particular variant is such that the second substrate 5 comprises a protrusion 62 which has a shape adapted to fit in the cavity 4 in the places where the electronic device 2 has a height h smaller than the depth of the cavity.

Accordingly, during the third step, the protrusion 62 in inserted into the cavity 4.

Accordingly, the protrusion 62 has a shape and a local height t that depends on the shape of the electronic device 2 and the shape of the cavity. The protrusion 62 is thus predetermined to have locally a height t that allows simultaneously bringing into contact the main surfaces 51 and 52, have the protrusion 62 enter into cavity, and still allows enough space for the electronic device 2.

It should be noted that in this variant, when it is said that the height h is smaller than the "depth of the cavity" for a particular area it means that the height h of the electronic device 2 in that area is does not reach or protrudes from the cavity 4 in that area, when the electronic device is already positioned in the cavity 4. For example, in said area there can be locally a gap between a part of the electronic device 2 and the bottom of the cavity 4.

It should also be noted that in this figure is represented an opening 71 into the cavity 4, which opens the bottom of the cavity.

In advantageous embodiments, the height h is smaller than the depth of the cavity 4 by an under-thickness in the range [0.5 mm; 5 mm], preferably in the range [0.5 mm; 2 mm].

In a non-illustrated embodiment of this variation, the solvent, here acetone, can be spread on the side 63 of the protrusion 62 that are predetermined to be in contact with some walls, or part of the walls 44, of the cavity 4 after the two main surfaces 51-52 are brought into contact.

In a particular variation, represented in FIG. 6C, the protrusion 62 has an outline that fits an outline of the cavity 2. In that case, when positioned in the cavity 4, the electronic device 2 has a height h smaller than the depth of the cavity 4 in all areas of the cavity. In this variation, the edges of the protrusion 2 are preferably designed to all come in contact with part of the walls of the cavity 4 once the first substrate 3 and the second substrate 5 are fitted together.

In a non-illustrated variation, the protrusion 62 has an outline that is different than the outline of the cavity 4 and that is determined so that it can fit into the cavity 4. For example only some part of the outline 62 corresponds to part of the outline of cavity 4. In that example it can be advantageous if some solvent is brought at the interface between the edges of the protrusion 62 and the corresponding walls of the cavity 4.

In another non-illustrated variation the second substrate 5 has an outline and a thickness which corresponds to the outline and the thickness of the protrusion 62 as defined above. Said in other words, the second substrate is adapted to be fitted into the cavity 4, embedding the electronic device 2 between the second substrate 5 and the bottom of the cavity. In such example, there is no contact between the main surface of the second substrate 5 and the main surface of the first substrate 3; conversely, the contact allowing both substrates to be fitted together happens through the edges of the second substrate 5 and part of the walls of the cavity 2.

In a particular case of this variation, the second substrate is transparent and/or clear; thus allowing to perceive clearly the embedded electronic device.

Figure 6D:
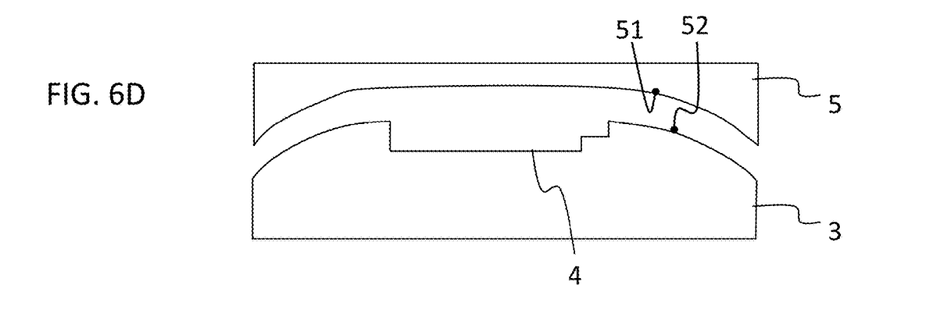

FIG. 6D represents yet another variant of the process, where the main difference is illustrated by showing the variation during the fourth step. In that particular case is illustrated the variant according to which the main surface 52 of the first substrate 3 and the main surface 51 of the second substrate 5 are not planar. As can be seen in FIG. 6D, the main surfaces 51-52 have a curvature; the curvature of the main surface 61 matching the curvature of the main surface 52.

More generally, the main surfaces 51-52 may have any shape whatsoever as long as the main surface 51 matches the main surface 52, notwithstanding the cavity 4 on either or both substrates, and a potential protrusion predetermined to fit into such cavity.

By a surface matching the other surface, one wants to express that the main surfaces can be brought in perfect or almost perfect contact, notwithstanding the cavity 4 on either or both substrates, and a potential protrusion predetermined to fit into such cavity. Perfect contact is defined as a contact with few or none air-gaps between the two surfaces.

FIGS. 7A to 7D illustrates a process to manufacture spectacle frames according to an embodiment of the invention.

Figure 7A:
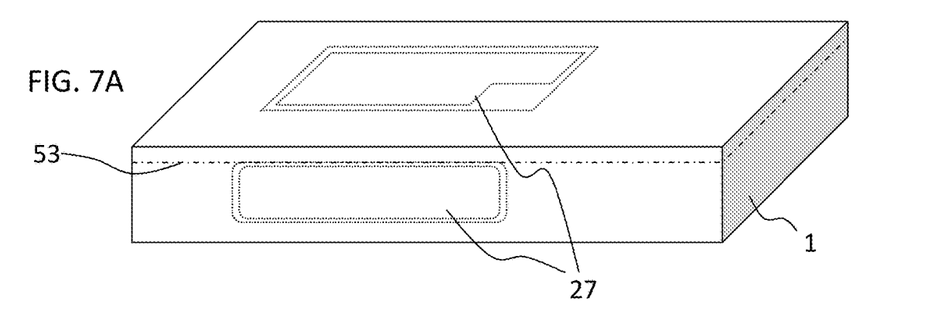
FIGS. 7A to 7D illustrate perspective views of a process of the invention for manufacturing spectacles frames comprising an embedded electronic device.

FIG. 7A illustrates the first step, in perspective, which corresponds to providing an acetate slab 1 comprising an embedded electronic device 27 obtained according to any of the previously described processes of the invention, and corresponding to any of the acetate slabs illustrated by FIG. 1A, 1B or 2A and 2B or their variations. The cavity and the embedded electronic device 27 are represented as if seen by transparency. In said figure are also represented traces of the interface 53 between the two acetate substrates used to for the acetate slab 1. In an advantageous embodiment, not illustrated here, as described with reference to FIG. 2B, the acetate slab 1 comprises markings or indicators enabling users to identify the position of the electronic device 2 into the acetate slab.

Figure 7B:
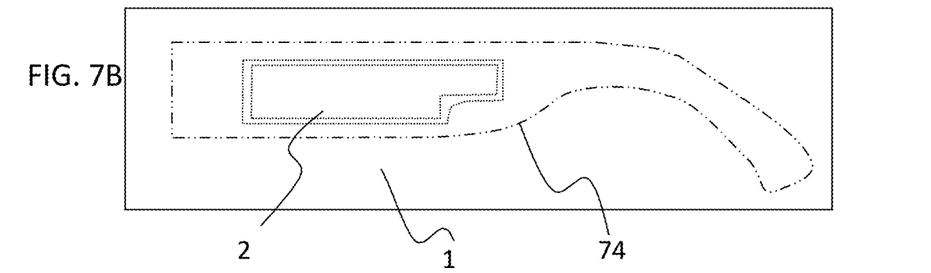

In the second step, illustrated in FIG. 7B, a part 74 of a frame is designed in the acetate slab 1 and cut out of the acetate slab 1. The part 74 of the frame comprises the embedded electronic device. Here, the part 74 of the frame is an arm of a frame. The part 74 of a frame has a design that corresponds to predetermined frames for spectacles. Accordingly, the shape of the part 74 of the from is designed with regard to the embedded electronic device 2, illustrated as if seen by transparency, so as to ensure that the electronic device is in an adapted place according to the final design needed for the spectacles frame and in its entirety. The shape of the part 74 of the frame that is cut from the acetate slab 1 may be different from a final shape of the part 74 of the frame. Indeed, it may take into account some local deformation or elongations that may be locally applied in further steps (not shown).

The part 74 of the frame can be cut out of the acetate slab 1 by manual means, using a cutting tool, or a manually activated mill.

Alternatively, the part of the frame can be cut out of the acetate slab by computer assisted means.

For example, the part 74 of the frame can be designed on a computer, comprising a memory and a processor, and a software adapted to design a part of a frame forming a design file. Then the design file can be used by a settings software adapted to transform data in said design file into a manufacturing settings adapted for controlling a predetermined manufacturing machine; the manufacturing settings being saved into a manufacturing settings file. Then the manufacturing settings file is used to control said predetermined manufacturing machine. The predetermined manufacturing tool may be an automated cutting machine, such as an automated saw, comprising a cutting tool, or an automated mill comprising a mill or other machines known by manufacturers of spectacle frames.

In such example, for using the manufacturing settings, it is needed to accurately position the acetate slab with regard to the cutter or the mill. Accordingly, the markings or indicators may be used to position accurately the acetate slab into the manufacturing machine.

Figure 7C:
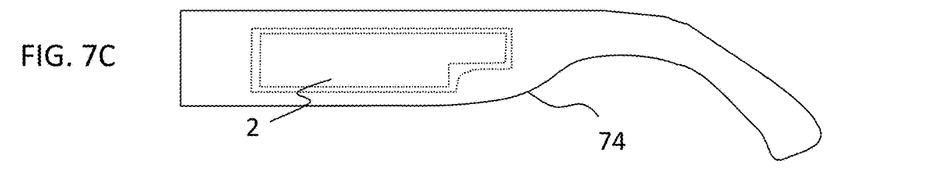

Accordingly, in the third step, illustrated in FIG. 7C, a part 74 of a frame is obtained, the part 74 of the frame comprising the embedded electronic device illustrated as if seen by transparency on the figure.

Figure 7D:
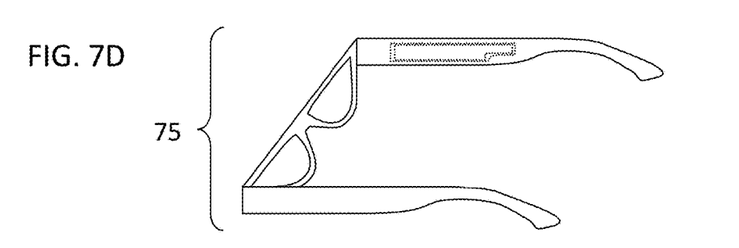

Eventually, a fourth step may be applied, illustrated in FIG. 7D, during which the part 74 of a frame is fitted to other parts of the frame to form a predetermined spectacles frames 75.

It is to be noted that the part of the frame may also be part of an arm, the nose-bridge of spectacle or part of it, the front part of a frame or any other part.

FIGS. 8A to 8D shows another process of the invention which enable to manufacture a part of a frame such as the one obtained and illustrated in FIG. 7C.

Figure 8A:
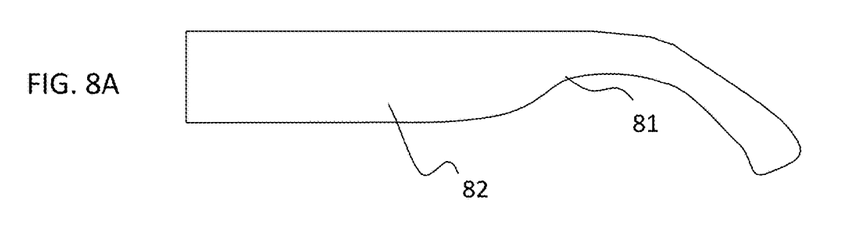
FIGS. 8A, 8B, 8C, 8C', and 8D illustrate an alternative process of the invention for manufacturing spectacles frames comprising an embedded electronic device.

According to this process one provides a part 81 of a frame, here an arm of spectacles' frame, or at least part of an arm as illustrated in FIG. 8A. The part 81 of a frame is chosen so has to have at least a section 82 with dimensions adapted for forming a cavity and receiving a predetermined electronic device. In particular the section 82 has a thickness greater than the depth of a cavity adapted to receive the predetermined electronic device, and a length and a width such that the outline of said electronic device fits in section 82, with a margin enabled to allow for walls of the cavity.

The margin may be such that it allows for a bottom wall of the cavity and for walls of the cavity to have a minimum thickness greater than about 250 µm, preferably greater than about 500 µm, and most preferably greater than about 1 mm.

Figure 8B:
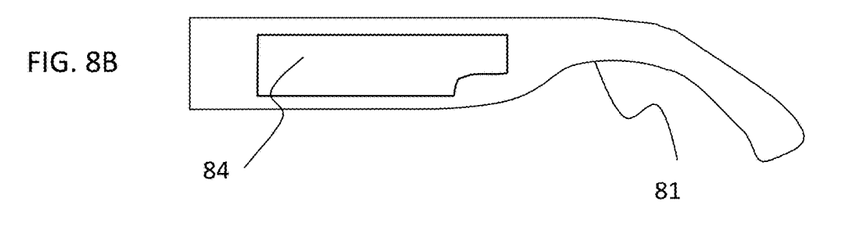

As illustrated in FIG. 8B, in a second step, the cavity 84 is formed into the part 81 of a frame, by methods mentioned above.

Figure 8C:
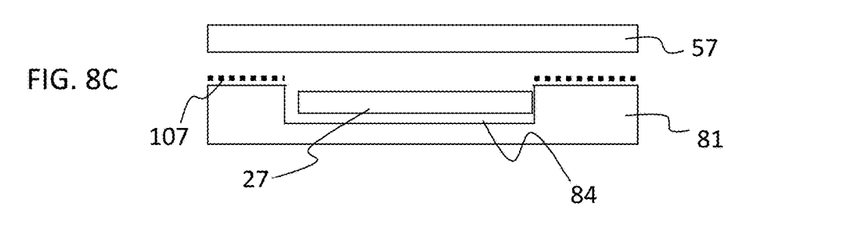

Then, in a third step, illustrated in FIG. 8C, showing a side view of the part 81 of a frame, the predetermined electronic device 27 is positioned into the cavity, a second substrate 57 is provided, acetone solvent 107 is deposited at the interface between the second substrate 57 and the part 81 of a frame. Then, the part 81 of a frame and the second substrate 57 are pressed together for the necessary duration until the two parts are fixed together, as mentioned above.

The second substrate 57 has a main surface matching the main surface of the part 81 of a frame which contains the cavity 84.

Preferably, the second substrate 57 has an outline than matches all or part of the outline of the part 81 of a frame. In a non-illustrated variant, the second substrate 57 has an outline that makes it overhang from the part 81 of a frame after being fixed together. A further step of trimming may be necessary to remove the un-needed part of the second substrate 57.

In a variant, illustrated in FIG. 8C', when the cavity 84 was edged, a difference D of level was created between the section 82 which in which the cavity 84 is formed, and another section of the part 81 of the frame. For example, the section 82 may be a level lower than the other section, for example a rear part of the arm of a frame, with a height difference D. In that case, the second substrate 57 may have an outline that fits with said section 82 and the thickness of the second substrate 57 may be adapted to compensate the height difference D of the difference of level.

Figure 8D:
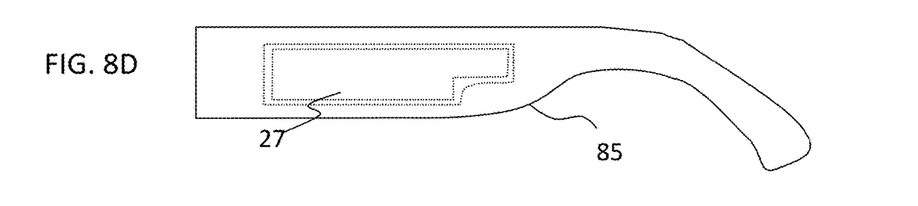

Whatever the variant of the third step, after the second substrate 57 is fixed with the part 81 of a frame, a composite part 85 of a frame is obtained, comprising an embedded electronic device 27, as illustrated in FIG. 8D; the embedded electronic device 27 being represented as if seen by transparency.

This composite part 85 of a frame may be treated as a standard part of a frame and assembled with other parts of a frame to form frames for a wearable apparatus such as spectacles.

The process and products of the invention may thus allow for forming spectacles adapted to receive active lenses, i.e.: an optical system which may comprise an active element such as a waveguide or a network of cells containing one or more materials having a refractive index or an absorbance that varies as a function of external stimuli, such as an electrochromic composition or liquid crystals or a photochromic composition.

As an advantage of the invention, the professionals frame designers may be thus provided with part of frames and materials that are easily transformable and adaptable into designer frames or other quality frames while containing and electronic device. Accordingly, professional frames designers have the possibility to create easily and with mostly traditional methods new designs of frames comprising electronic devices, without being limited into a set of specific designs or long design approval processes.

The invention claimed is:

1. A method of manufacturing of a composite substrate having an embedded electronic device, the method comprising:
providing a first substrate of cellulose acetate and a second substrate of cellulose acetate;
shaping at least one of the first substrate and the second substrate according to a first predetermined pattern to form a cavity for receiving the electronic device;
disposing the electronic device between the first substrate and the second substrate in said cavity;
providing a solvent of cellulose acetate in-between the first substrate and the second substrate and
maintaining the first substrate and the second substrate in contact together to form the composite substrate, wherein the electronic device is maintained between the first substrate and the second substrate,
wherein at least a part of a frame is designed on the composite substrate, wherein the part of the frame has a designed shape that is determined by taking into account the electronic device embedded in the composite substrate, wherein the at least one part of the frame is designed by referring to markings present on the substrate indicative of a feature of the electronic device before designing the part of the frame on the composite substrate, wherein the designed shape of the part of the frame and position of the frame in the composite substrate are determined by taking into account of a shape and a position of the electronic device in the composite substrate.

2. The method according to claim 1, wherein the first substrate is a cellulose acetate slab.

3. The method according to claim 2, wherein the second substrate is a cellulose acetate slab.

4. The method according to claim 1, wherein the first substrate is a part of a frame of an apparatus wearable by a user.

5. The method according to claim 1, wherein the first substrate and the second substrate are cellulose acetate sheets.

6. A method for manufacturing spectacles frame comprising the steps of:
providing a composite substrate, the composite substrate obtained from steps comprising:
providing a first substrate of cellulose acetate and a second substrate of cellulose acetate;
shaping at least one of the first substrate and the second substrate according to a first predetermined pattern to form a cavity for receiving an electronic device;
disposing the electronic device between the first substrate and the second substrate in said cavity;
providing a solvent of cellulose acetate in-between the first substrate and the second substrate; and
maintaining the first substrate and the second substrate in contact together to form the composite substrate, wherein the electronic device is maintained between the first substrate and the second substrate;
designing at least a part of a frame on the composite substrate, the part of the frame having a designed shape that is determined by taking into account the electronic device embedded in the composite substrate, wherein designing the at least one part of the frame comprises referring to markings present on the substrate indicative of a feature of the electronic device before designing the part of the frame on the composite substrate, wherein determining the designed shape of the part of the frame and position of the frame in the composite substrate takes into account of a shape and a position of the electronic device in the composite substrate; and
cutting the composite substrate according to the designed shape to form a part of the frame comprising an embedded electronic device; and
assembling the part of the frame with other parts of the frame so as to manufacture the frame.

7. The method according to claim 6, wherein the solvent is acetone.

8. The method according to claim 6, wherein the cavity is formed on both the first substrate and the second substrate.

9. The method according to claim 6, in which the cavity opens on both ends of the first substrate, one opening being smaller than another opening.

10. The method according to claim 6, further comprising assembling the at least one part of the frame to manufacture a spectacle frame.

11. The method according to claim 6, where the first substrate and the second substrate are at least one of cellulose acetate slabs and cellulose acetate sheets.

12. A composite cellulose acetate bloc, comprising:
an internal cavity encompassing an electronic device, the cavity being tight-fitted to the electronic device so that the electronic device, from the bloc, if a part of the bloc, is not cut open; and
markings indicative of a position of features of the electronic device, wherein the markings represent at least one of an engraving, glued stamps, ink embedded in the cellulose acetate, ink present on the cellulose acetate, and specific shapes on the bloc.

13. The composite cellulose acetate bloc of claim of 12, wherein the composite cellulose acetate bloc is at least one of a cellulose acetate slab and sheet operable to be used to manufacture a part of a frame of a wearable apparatus.

14. The composite cellulose acetate bloc of claim 12, wherein features of the electronic device indicate at least one of an orientation, a position, a shape and an area covered by the electronic device.

15. The composite cellulose acetate bloc of claim 12, wherein features of the electronic device indicate at least one of features related to any specific functional area of the electronic device, type of the electronic device, position of the electronic device, shape of the electronic device.

16. The composite cellulose acetate bloc of claim 12, wherein features of the electronic device indicate at least one of a feature related to connection area of the electronic device, a battery point of the electronic device, an entry point of the electronic device, connections paths of the electronic device, position of one or more sensors of the electronic device, and orientation of the one or more sensors of the electronic device.

\* \* \* \* \*